(146.)

T. J. W. ROBERTSON.

Hand Stamp.

No. 4,675. Reissued Dec. 12, 1871.

Witnesses:

J. Meathys.

Thos. L. D. Durand

Inventor:

T. J. W. Robertson

AM. PHOTO-LITHOGRAPHIC CO. N.Y. (OSBORNE'S PROCESS.)

UNITED STATES PATENT OFFICE.

THOMAS J. W. ROBERTSON, OF WASHINGTON, DISTRICT OF COLUMBIA.

IMPROVEMENT IN HAND-STAMPS.

Specification forming part of Letters Patent No. 18,249, dated September 22, 1857; extended seven years; reissue No. 4,675, dated December 12, 1871.

*To all whom it may concern:*

Be it known that I, THOMAS J. W. ROBERTSON, of Washington, in the county of Washington and District of Columbia, have invented certain Improvements in Hand-Stamps; and I do hereby declare that the following is a full, clear, and exact description thereof, which will enable others skilled in the art to make and use the same, reference being had to the accompanying drawing forming part of this specification, in which—

Figure 2:
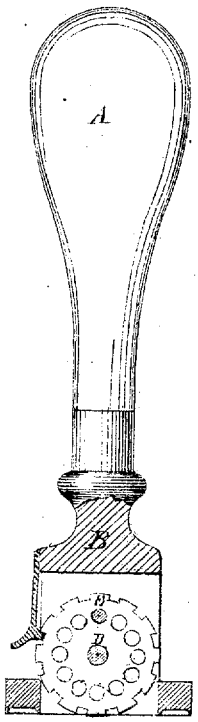
Figure 1:
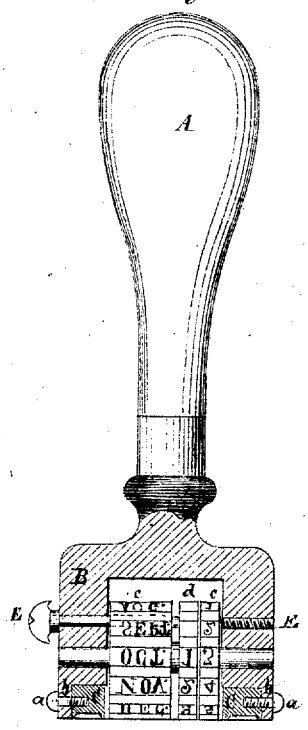
Figure 3:
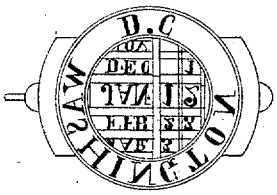

Figure 1 is a side sectional elevation of my improvement. Fig. 2 is a central sectional elevation of the same. Fig. 3 is a plan view of the bottom of the stamp.

Similar letters of reference indicate corresponding parts in the several figures.

My invention relates to the construction of stamps for producing an impression such as a post-mark or other analogous device, a part of which requires to be frequently changed, such as the date, and part requires to remain the same, as the name of the post-office. In order to give such stamps any considerable utility the impression must be readily made and that part of the type which requires frequent change must be always on hand. This result I secure by combining in a hand-stamp fixed type for producing that part of the inscription designed to be always the same and a series of combined changeable types bearing the necessary characters to allow of any desired change, which shall be connected with and form part of the stamp. These types are connected and arranged to revolve in substantially the same manner as the combined types used in book-paging machines, but differing therefrom in having an arrangement by which the desired inscription may be printed repeatedly without changing at each impression. Prior to my invention dating-stamps were made with loose types, book-paging machines were used with combined types in the form of wheels and chains, and machines for printing tickets, &c., had type-wheels combined with permanent inscription-forms; but these last machines were so made as to produce the impression only on the under surface of the materials and to change the type-wheels at every stroke. So far as I am aware, no dating-stamp was ever made previous to mine with wheel-type or its equivalent, nor a fixed inscription-plate or form combined with such type in such a manner that the latter could be readily turned without changing the relative positions of the said wheels and permanent inscription and yet be capable of printing simultaneously the combined inscriptions in a small space, as is necessary in canceling revenue-stamps; nor could an impression be readily made by such machines on the upper surface of the paper. My invention, therefore, consists, mainly, in the construction of a stamp in which combined changeable dating-type are used in combination with a fixed inscription-form or printing-die, and in so arranging these parts in connection with a stem or handle that the dating-types may be easily changed and thoroughly secured, and that the impression may be readily made in a small compass on the upper surface of the material.

A is the handle, to the bottom of which is attached a metallic forked shank, B. To the bottom of this shank is attached a metallic ring, C, said ring being secured to the shank by means of screw-bolts *a*. The lower part of the shank is also notched, as shown at *b b*, in order to receive the ring C and form a front bearing for it. Various other methods may be adopted, at the pleasure of the maker, for attaching the ring C to the shank B. When the stamp is intended for a letter-stamp the name of the post-office may be engraved upon the face of the ring C, as shown in Fig. 3. D is a shaft which passes horizontally through the shank B. Upon this shaft are placed three type-wheels, *c d e*, which revolve independent of each other on the shaft D. The faces of these type-wheels may be provided, respectively, with the names of the months, of the year, and also ten numerals. The shaft D is arranged at such a distance from the face of the ring C that the type-wheels *c d e* may be turned so that the types upon said wheels will come in line or form a horizontal plane with the types on the ring C, and thus, when the face of the stamp is inked over by any suitable inking device and the stamp duly pressed upon a letter or other suitable substance an impression will be left thereupon of the types contained on the ring C, and also of those types of the type-wheels *c d e* that are in line with the types on the ring C. It will be seen that only one line of types upon the type-wheels can simultaneously come into a horizontal plane with the types on the ring C, the remaining types being distributed around the peripheries of the type-wheels *c d e* so that they cannot touch the paper on which the impression is to be made. E is a lock-pin, which passes horizontally through the shank B and also through the type-wheels *c d e*. The object of this pin E is to lock the type-wheels so that when any one line of types has been turned and brought into a horizontal plane with the types upon the ring C the said line of types will be held fast and prevented from getting out of place. By removing the pin E the combination of letters on the type-wheels *c d e* may be changed at pleasure. F is a space-wheel or washer upon the shaft D; it is there placed for the purpose of having a greater distance between the type-wheels.

The stamp here shown has the face of its ring C made in circular form; but it is obvious that the shape of the ring may be changed to suit the pleasure of the purchaser without changing the general construction of the stamp. The type-wheels and ring may also be engraved with any suitable letters or figures.

This device is particularly useful for stamping letters, tickets, &c., where the words or numbers have to be frequently changed.

Instead of the pin E for locking the type-wheels small springs may be used, one end of each being attached to the shank B and the other ends pressing into the interstices between the lines of types upon the type-wheels, and are so made as to prevent accidental movement of the wheels in either direction.

I do not limit myself to the precise construction here shown, as it may be changed without essentially varying from my invention.

Although either the pin E or springs may be used separately for locking the type-wheels, I should prefer to use them in combination, as the springs may hold the day-wheels in position when the month-wheel is being turned, which the pin E will not do; and when the wheels are properly arranged the pin may be screwed fast and the wheels much more securely locked than by the use of springs alone.

Having thus described my invention, what I claim as new, and desire to secure by Letters Patent, is—

1. In combination with a handle and a series of printing-wheels or their equivalents for printing dates, a fixed type-form or printing-die for dating purposes, substantially as described.

2. A hand-stamp having a permanent inscription-form or die provided with an aperture through which the type-wheels work, when so arranged that the said type-wheels may be turned for changing the dates without shifting the fixed form or die, substantially as specified.

3. A hand-stamp having a series of type-wheels provided with holes to receive a locking-pin, E, substantially as specified.

T. J. W. ROBERTSON.

Witnesses:
CHAS. A. PETTIT,
THOS. D. D. OURAND.

(146)